(12) United States Patent
Karppanen

(10) Patent No.: US 9,274,861 B1
(45) Date of Patent: Mar. 1, 2016

(54) SYSTEMS AND METHODS FOR INTER-PROCESS MESSAGING

(71) Applicant: Amazon Technologies, Inc., Seattle, WA (US)

(72) Inventor: Jari Juhani Karppanen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/537,408

(22) Filed: Nov. 10, 2014

(51) Int. Cl.
*G06F 9/54* (2006.01)
*G06F 15/167* (2006.01)
*G06F 15/16* (2006.01)

(52) U.S. Cl.
CPC ............. *G06F 9/546* (2013.01); *G06F 15/167* (2013.01)

(58) Field of Classification Search
None
See application file for complete search history.

(56) References Cited

U.S. PATENT DOCUMENTS

| 7,152,231 | B1* | 12/2006 | Galluscio et al. | 719/312 |
| 2002/0144010 | A1* | 10/2002 | Younis et al. | 709/314 |
| 2005/0262215 | A1* | 11/2005 | Kirov et al. | 709/207 |
| 2012/0131285 | A1* | 5/2012 | Leshchiner et al. | 711/147 |

* cited by examiner

*Primary Examiner* — Andy Ho
*Assistant Examiner* — Abdou Seye
(74) *Attorney, Agent, or Firm* — Sutherland Asbill & Brennan LLP

(57) ABSTRACT

Provided are systems and methods for a first process for writing messages to a shared memory (each of the messages being written to a respective buffer of the shared memory, and the messages configured to be read in a specified sequence by a second process), determining that writing of one of the messages to the shared memory has been completed and, sending, to the second process and in response to determining that writing of one of the messages to the shared memory has been completed, an offset value corresponding to a location in the shared memory, wherein the second process is configured to read one or more messages that are stored in the portion of the shared memory before the offset value. Also the second process reads one or more messages stored in buffers that reside in the portion of the shared memory before the offset value, and commits the reads.

15 Claims, 5 Drawing Sheets

SYSTEMS AND METHODS FOR INTER-PROCESS MESSAGING

BACKGROUND

In the context of computer processing, inter-process messaging (IPM) (also referred to as inter-process communication (IPC)) involves the exchange of data among multiple threads of one or more computer processes. In some instances, IPM is implemented using named pipes that have a given size and simple send/receive semantics. The exchange of messages via IPM often involves complex schemes for synchronizing the exchange of data to ensure that events, such as data writes and reads, occur in the correct sequence. In certain IPM techniques, delays are created, for example, if a receiver is busy and the sender has to wait until a receiver is ready to send its data.

Figure 1A:
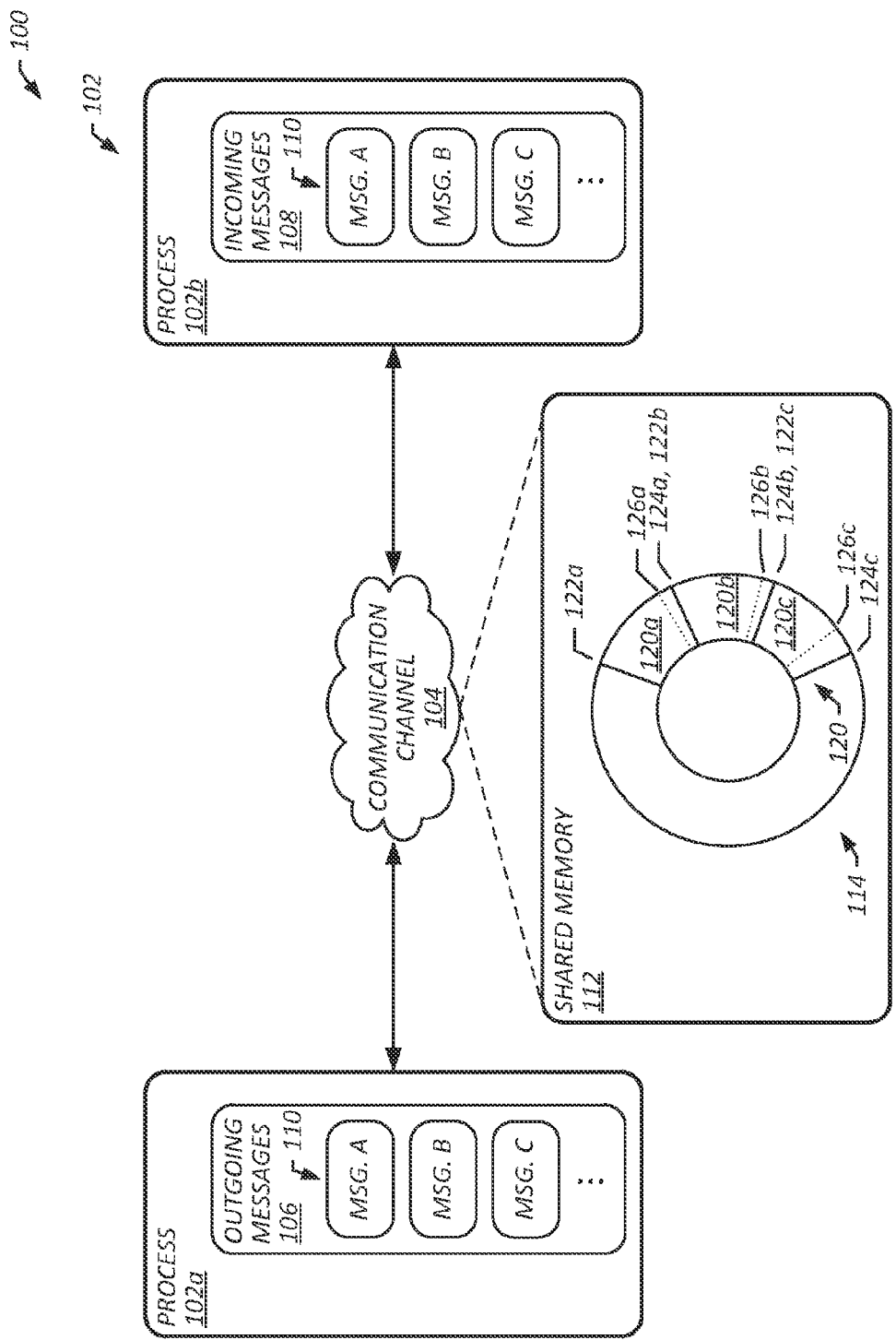
FIGS. 1A and 1B are diagrams that illustrate an inter-process messaging environment in accordance with one or more embodiments.

While this disclosure is susceptible to various modifications and alternative forms, specific embodiments thereof are shown by way of example in the drawings and will be described in detail herein. The drawings may not be to scale. It should be understood, however, that the drawings and detailed description thereto are not intended to limit the disclosure to the particular form disclosed, but to the contrary, the intention is to cover all modifications, equivalents, and alternatives falling within the spirit and scope of the present disclosure as defined by the appended claims.

DETAILED DESCRIPTION

Described herein are systems and methods for inter-process messaging. In some embodiments, inter-process messages (also referred to herein as "messages") are exchanged between one or more processes executing on one or more computers. For example, a first thread operating in one process may provide data that is ultimately received by a second thread operating in another process. In some embodiments, the message exchange is facilitated by shared memory. Shared memory may include a memory that is simultaneously accessible by multiple processes (e.g., programs, threads, and/or the like). The first thread may, for example, write message A to shared memory (e.g., a memory location that is accessible to both threads), and the second thread may read message A from the memory location. In some embodiments, multiple messages are exchanged in a similar fashion. For example, the first thread may write messages A, B and C to the first, second and third shared memory locations, respectively, and the second thread may read messages A, B and C from the respective shared memory locations.

In some embodiments, the shared memory locations are implemented as a circular buffer. A circular buffer (also referred to as a "cyclic buffer" or a "ring buffer") may include a data structure that uses a single, fixed-size buffer as if it were connected end-to-end. For example, the first thread may write messages A, B and C to first, second and third shared buffers of a circular buffer in shared memory, respectively, and the second thread may read messages A, B and C from the respective buffers. The circular buffer in the shared memory may be referred to as a shared circular buffer. After each of the messages are read by the second thread (or otherwise no longer need to be stored in the shared memory), the respective buffers of the circular buffer may be released such that they can be overwritten by other data. For example, if the circular buffer is divided into four buffers that are each capable of storing a single message, then messages A, B, C and D may be written to the first, second and third buffers, respectively. If, for example, the second thread has completed reading message A, then the first buffer of the circular buffer may be released such that the data can be overwritten by other data, such as message E. This cycle may continue, allowing the fixed sized circular buffer to support repeated writing and reading of messages.

In some embodiments, the exchange of inter-process messages is facilitated by an inter-process messaging management scheme. The scheme may include, for example, identifying multiple inter-process messages to be transmitted from a first (sending) process to a second (receiving) process, creating a channel for exchanging the messages (e.g., including allocating shared memory space, such as a shared circular buffer, for the inter-process messages) and exchanging the messages via the channel (e.g., the sending process writing messages in parallel to the shared buffers of the shared circular buffer and/or the receiving process reading messages in parallel from the shared buffers). Such embodiments may enable the sending process to write one or more messages (e.g., to a shared buffer) before the receiving process is ready to read the messages (e.g., before the receiving process is finished reading the first message in the sequence of messages). Such a scheme may allow zero-copy semantics by allocating messages in-place directly to the shared memory, may not force a sender to wait when the receiver is busy, may use inter-process synchronization primitives only occasionally, and/or may not need mutual exclusion between the sender and the receiver.

In some embodiments, messages are constructed in-place by providing an allocator that reserves space directly off of an internal buffer (e.g., the shared memory) using placement construction. In some embodiments, message sending is done in two phases: (1) reserve space phase (e.g., allocating shared memory space for the inter-process message), and (2) commit phase (e.g., writing the inter-process message to the shared memory space). In some embodiments, message receiving is done in two phases: (1) receive pointer phase (e.g., identifying the location of the inter-process message in the shared memory and reading it), and (2) clear-to-erase phase (e.g., releasing the shared memory space once the message has been read).

FIG. 1A is a diagram that illustrates an inter-process messaging environment ("environment") 100 in accordance with one or more embodiments. In the illustrated embodiment, the environment 100 includes processes 102 communicatively coupled via a communication channel ("channel") 104. Processes 102 may include at least a process 102a and a process 102b. In the illustrated embodiment, the process 102a includes outgoing messages 106 (e.g., messages A, B and C) that are to be (or have been) transmitted from the process 102a to another receiving process 102 such as the process 102b. In the illustrated embodiment, the process 102b includes incoming messages 108 (e.g., messages A, B and C) that may be messages that have been received from another process 102 such as the process 102a. A process 102 that sends an inter-process message 110 (e.g., process 102a) may be referred to as a "sending" process. A process 102 that receives an inter-process message 110 (e.g., process 102b) may be referred to as a "receiving" process. Although certain embodiments are described in the context of a certain process 102 sending inter-process messages 110 and a certain process 102 receiving inter-process messages 110 for the purpose of illustration, embodiments may include a process 102 that both sends and receives inter-process messages 110.

In some embodiments, a process 102 includes a process that is executed by one or more computer processors. A process 102 may include, for example, a thread executed by a single processor of a computer (e.g., thread A executed by processor A of computer A). As additional examples, a process 102 may include multiple threads executed by a single processor of a computer (e.g., threads A and B executed by processor A of computer A), multiple threads executed by multiple processors of a computer (e.g., threads A and B executed by processors A and B of computer A), or multiple threads executed by multiple processors of multiple computers (e.g., thread A executed by processor A of computer A, and thread B executed by processor B of computer B). A processor may include, for example, one or more processors of a computer system similar to that of computer system 1000 described herein with regard to at least FIG. 5.

In some embodiments, the communication channel 104 is a conduit (e.g., a pathway or a medium) for exchanging inter-process message data between multiple processes 102. For example, in the context of inter-process messaging within the environment 100, the channel 104 may be a conduit for transferring inter-process messages 110 from the first process 102a to the second process 102b, or vice versa. In some embodiments, the channel 104 includes a physical transmission medium such as a wire, or a logical connection over a multiplexed medium such as a radio channel or other wireless communication medium. If processes 102a and 102b are executed by two processors in the same physical computer, then the channel 104 may include a physical pathway such as a wire and/or shared memory (e.g., the shared memory 112) that communicatively couples the two processes 102. If processes 102a and 102b are executed by two processors in different physical computers that are coupled via a wired and/or a wireless network, then the channel 104 may include a physical pathway such as a wire, a wireless network connection, and/or shared memory (e.g., the shared memory 112) that communicatively couples the two processes 102.

In some embodiments, the channel 104 includes a shared memory 112. The shared memory 112 may include a memory space that is simultaneously accessible by multiple processes 102. As discussed herein, the first process 102a may, for example, write message A to the shared memory 112, and the second process 102b may read message A from the shared memory 112. In some embodiments, the shared memory 112 is arranged to include a shared circular buffer ("circular buffer") 114. The circular buffer 114 may include a data structure that uses a single, fixed-size buffer (e.g., 800-byte buffer) as if it were connected end-to-end. In some embodiments, sub-portions of the memory space of the circular buffer 114 are allocated to create shared buffer locations ("buffers") 120 that are reserved for handling/storing a particular inter-process message 110 during its exchange from one process 102 to another process 102. For example, a first buffer 120a (e.g., bytes 0-99) of the circular buffer 114 may be allocated/reserved for message A, a second buffer 120b (e.g., bytes 100-199) of the circular buffer 114 may be allocated/reserved for message B, and a third buffer 120c (e.g., bytes 200-299) of the circular buffer 114 may be allocated/reserved for message C. In some embodiments, the circular buffer 114 may include a contiguous memory area for storing data and/or each of the buffers 120 of the circular buffer 114 may include a contiguous memory area for storing data. During inter-process transmission of the messages A, B and C, the first process 102a may write messages A, B and C to first, second and third buffers 120a, 120b and 120c, respectively, and the second process 102b may read messages A, B and C from the respective first, second and third buffers 120a, 120b and 120c. After each of the messages A, B and C are read by the second process 102b (or otherwise no longer need to be stored in the shared memory 112), the respective buffers 120 may be released such that they can be overwritten by other data. If the circular buffer 114 is divided into eight shared memory locations that are each reserved for storing a single inter-process message 110, for example, then messages A-I may be written to the eight buffers 120, respectively. If, for example, the second process 102b has completed reading message A from first buffer 120a, then the first buffer 120a may be released such that the data can be overwritten by other data, such as a ninth message, e.g., message J. This cycle may continue, allowing the fixed sized circular buffer 114 to support repeated writing and reading of inter-process messages 110.

In some embodiments, a buffer 120 may be larger than the amount of data that is expected to be ultimately stored in the buffer 120. For example, if 95% of the messages of a given type are less than 100 bytes, then the buffers 120 may each be 100 bytes in size such that the first buffer 120a spans bytes 0-99 of the circular buffer 114 (e.g., having a buffer start 122a and a buffer end 124a at respective bytes 0 and 99 of the circular buffer 114), the second buffer 120b spans bytes 100-199 of the circular buffer 114 (e.g., having a buffer start 122b and a buffer end 124b at respective bytes 100 and 199 of the circular buffer 114), and the third buffer 120c spans bytes 200-299 of the circular buffer 114 (e.g., having a buffer start 122c and a buffer end 124c at respective bytes 200 and 299 of the circular buffer 114). Thus, for example, if the inter-process messages 110 are smaller than the respective buffers 120 in which they are stored, then the messages may occupy only a portion of the allocated space, having an end of message location that occurs before the end of the buffer 120. For example, if the data for messages A, B and C are 90 bytes, 90 bytes and 80 bytes in size respectively, then the data for message A stored in first buffer 120a may stop at message end 126a located at byte 89 of the circular buffer 114, the data for message B stored in second buffer 120b may stop at message end 126b located at byte 189 of the circular buffer 114, and the data for message C stored in third buffer 120c may stop at message end 126c located at byte 279 of the circular buffer 114. Thus, the buffer end may not directly align with the message end.

If an inter-process message 110 is too large for the buffer 120 allocated for the inter-process message 110, then at least a portion of the data for the inter-process message 110 may be stored in another buffer location (e.g., in a different shared memory or circular buffer). For example, in the event the amount of data to be written for a message A exceeds the size of fist buffer 120a, a replacement buffer (or alternative buffer) 120 may be allocated (e.g., in the same circular buffer 114 or a different portion of shared memory), a pointer to the location of the replacement buffer 120 may be written in first buffer 120a, and the data for message A may be written to the replacement buffer 120. The pointer may include, for example, a placeholder (or redirect) message (e.g., a 16-byte redirect message). In such an embodiment, upon -encountering the pointer in the first buffer 120a (e.g., reading the place holder message), the receiving process 102b may be directed (by the pointer) to read the message data from the replacement buffer 120. In some embodiments, a pointer to the location of the next buffer 120 to be read (e.g., to second buffer 120b) may be written into the replacement buffer 120 (e.g., at the end of the message data in the replacement buffer 120). The pointer may include, for example, a return (or redirect) message (e.g., a 16-byte redirect message). In such an embodiment, upon encountering the pointer in the replacement buffer 120 (e.g., reading the return message at the end of the message data in the replacement buffer 120), the receiving process 102b may be directed (by the pointer) to read data from the next buffer 120 (e.g., directed to read data of the second buffer 120b, if the data for message B is the next set of data to be read).

Figure 1B:
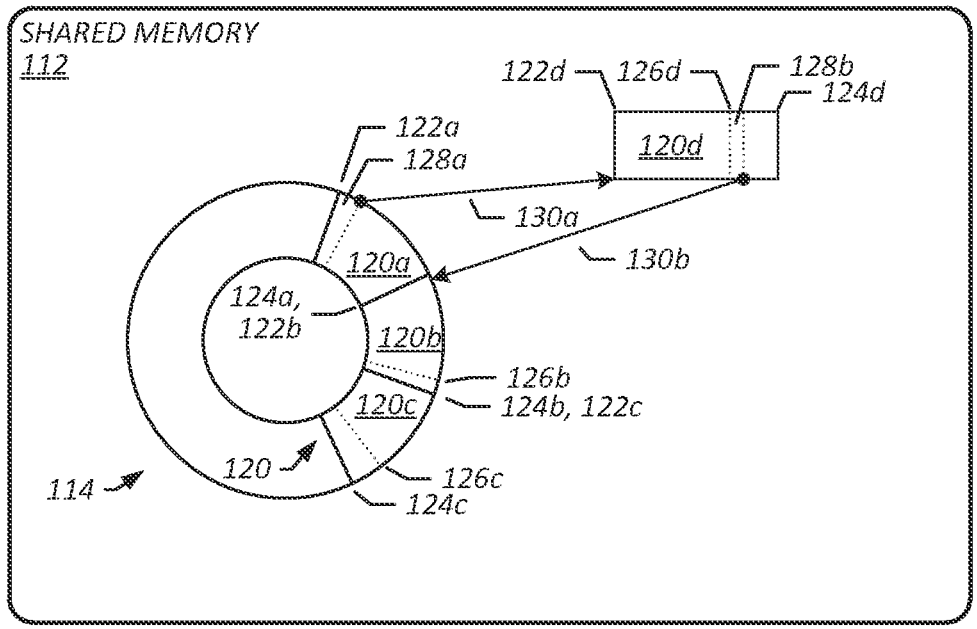

FIG. 1B is a diagram that illustrates an inter-process messaging process involving use of a replacement buffer (or alternative buffer) 120d in accordance with one or more embodiments. The replacement buffer 120d may have a buffer start 122d and a buffer end 124d. Although separate from the circular buffer 114 for the purpose of illustration, the replacement buffer 120d may be located in the circular buffer 114 or another portion of shared memory 112 (e.g., in a different circular buffer 114 of shared memory 112). Continuing with the above example, if message A is 180 bytes in size and first buffer 120a is 100 bytes in size (e.g., message A exceeds the size of first buffer 120a by 80 bytes), then the replacement buffer 120d may be allocated (e.g., a 200-byte buffer may be allocated), a pointer 128a (e.g., a redirect pointer) to the location of the replacement buffer 120d may be written into first buffer 120a, and the 180 bytes of data for message A may be written to the replacement buffer 120d. In some embodiments, a pointer 128b (e.g., a return pointer) to the location of the next buffer 120 to be read (e.g., to second buffer 120b) may be written into the replacement buffer 120d (e.g., at the end of the message data in the replacement buffer 120d). The pointer 128a may include, for example, a placeholder (or redirect) message (e.g., a 16-byte redirect message). The pointer 128b may include, for example, a return (or redirect) message (e.g., a 16-byte redirect message). The allocated replacement buffer 120d may be large enough to hold the message data and a pointer 128b (e.g., at least 196 bytes in size, to hold the 180-bytes message data and a 16-byte return message). In such an embodiment, upon encountering the pointer 128a in the first buffer 120a (e.g., reading the place holder message), the receiving process 102b may be directed (by the pointer 128a) to read the message data from the replacement buffer 120d. Upon encountering the pointer 128b in the replacement buffer 120d (e.g., reading the return message at the end of the message data in the replacement buffer 120d), the receiving process 102b may be directed (by the pointer 128b) to read data from the next buffer 120 (e.g., directed to read data of the second buffer 120b, if the data for message B is the next set of data to be read). The pointer 128a may, thus, redirect of the receiving process 102b to read the data for message A at the buffer start 122d of buffer 120d (as illustrated by arrow 130a). The receiving process 102b may read the portion of message A in the replacement buffer 120d, and once the receiving process 102b has completed reading the portion of message A in the replacement buffer 120d (e.g., has read to message end 126d located at about byte 80 of the replacement buffer 120d) and read the pointer 128b, the receiving process 102b may be redirected by the pointer 128b (e.g., in the replacement buffer 102d) to the next buffer 120 to be read. If, for example, message end 126d is the end of message A, and message B is the next message in sequence and is ready to be read (e.g., message B is committed), then the pointer 128b in the buffer 120d may redirect the receiving process 102b to continue reading at the start of second buffer 120b. The pointer 128b may, thus, redirect the receiving process 102b to continue reading message B at the buffer start 122b of second buffer 120b (as illustrated by arrow 130b). The receiving process 102b may, then, read the portion of message B stored in second buffer 120b.

Figure 2:
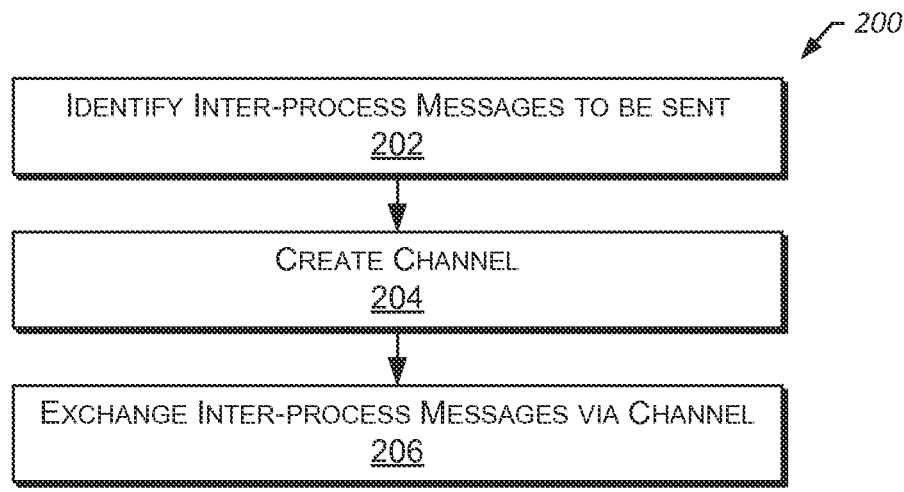
FIG. 2 is a flowchart that illustrates a method of inter-process messaging in accordance with one or more embodiments.

FIG. 2 is a flowchart that illustrates a method 200 of inter-process messaging in accordance with one or more embodiments. Method 200 may generally include identifying inter-process messages to be sent (block 202), creating a channel (block 204), and exchanging inter-process messages via the channel (block 206).

In some embodiments, identifying inter-process messages to be sent (block 202) includes identifying a plurality of inter-process messages 110 to be transmitted from a first (or sending) process 102 to a second (or receiving) process 102. Identifying a plurality of inter-process messages 110 to be transmitted from a first process 102 to a second process 102 may include, for example, the sending process 102a and/or the receiving process 102b identifying messages A, B and C that are to be transmitted from the sending process 102a to the receiving process 102b. In some embodiments, it may be intended for the identified messages to be transmitted in a specified sequence or order. For example, it may be intended that the messages A, B and C are read by the receiving process 102b in the order A-B-C.

In some embodiments, identifying inter-process messages to be sent (block 202) includes determining an upper bound for the size of the plurality of inter-process messages 110 to be transmitted from the first process 102 to the second process 102. If messages A, B and C are identified to be transmitted from the sending process 102a to the receiving process 102b, for example, then determining an upper bound size for the plurality of inter-process messages 110 may include determining an upper bound size for each, some or all of the messages A, B and C. In some embodiments, an upper bound size may be over-estimated to increase the probability that the message data (and associated data) ultimately written will fit in the space allocated using the upper bound size. In some embodiments, a default size may be associated with a given message type. For example, if 95% of the inter-process messages 110 of a given type are less than about 95 bytes, then a default 100-byte upper bound message size may be associated with each message of the given type. Thus, for example, if messages A, B and C are of a type associated with a default size of 100 bytes, then a 100-byte upper bound message size may be determined for each of messages A, B and C, and/or an overall size of 300 bytes may be determined for all of messages A, B and C. Use of a default message size may reduce overhead because an actual message size may not need to be determined. In some embodiments, the process (or channel) allocating the buffers can obtain an estimate of the message sizes from the sending process 102a. In such an embodiment, the sending process 102a can query the lengths of some internal variables (e.g., sum the length of two long strings whose lengths vary, and then just add a lump size to cover for all the other data, whose size varies much less) to identify a message size that is used by the process allocating the buffers. The upper bound for the size of the plurality of inter-process messages 110 may be based on the message size identified by the sending process 102a.

In some embodiments, creating a channel (block 204) includes creating a channel 104 for exchanging the plurality of inter-process messages 110 from the sending process 102a to the receiving process 102b. Creating a channel 104 for exchanging the plurality of inter-process messages 110 from the sending process 102a to the receiving process 102b may include allocating one or more buffers 120 of the circular buffer 114 that are at least of the determined upper bound size, and that are reserved for receiving the inter-process messages 110 of the plurality of inter-process messages 110. Creating a channel 104 for exchanging messages A, B and C may include, for example, the sending process 102a and/or the receiving process 102b allocating 300 bytes of the circular buffer 114 for receiving the three messages. In some embodiments, either of the sending or receiving processes 102 may create the channel 104. The process 102 that creates the channel 104 may notify the other process 102 that it is creating the channel 104 and/or that the channel 104 has been created. In some embodiments, creating the channel 104 includes allocating sub-portions of the shared memory 112 that are reserved for receiving respective inter-process messages 110. In some embodiments, the message slots (e.g., the buffers 120) are not associated with or otherwise reserved for a particular message 110 at the time of creating the channel. The message slots (or buffers) may instead be associated with a particular message dynamically, at a later time (e.g., "on-demand"). For example, the sending process 102a and/or the receiving process 102b may, later, reserve the first buffer 120a (e.g., bytes 0-99) of the circular buffer 114 for message A, reserve the second buffer 120b (e.g., bytes 100-199) of the circular buffer 114 for message B, and reserve the third buffer 120c (e.g., bytes 200-299) of the circular buffer 114 for message C on-demand (e.g., dynamically assigning the messages to respective buffers after the buffers 120 have been allocated generally, but before writing the respective messages 110 to the respective buffers 120).

Figure 3:
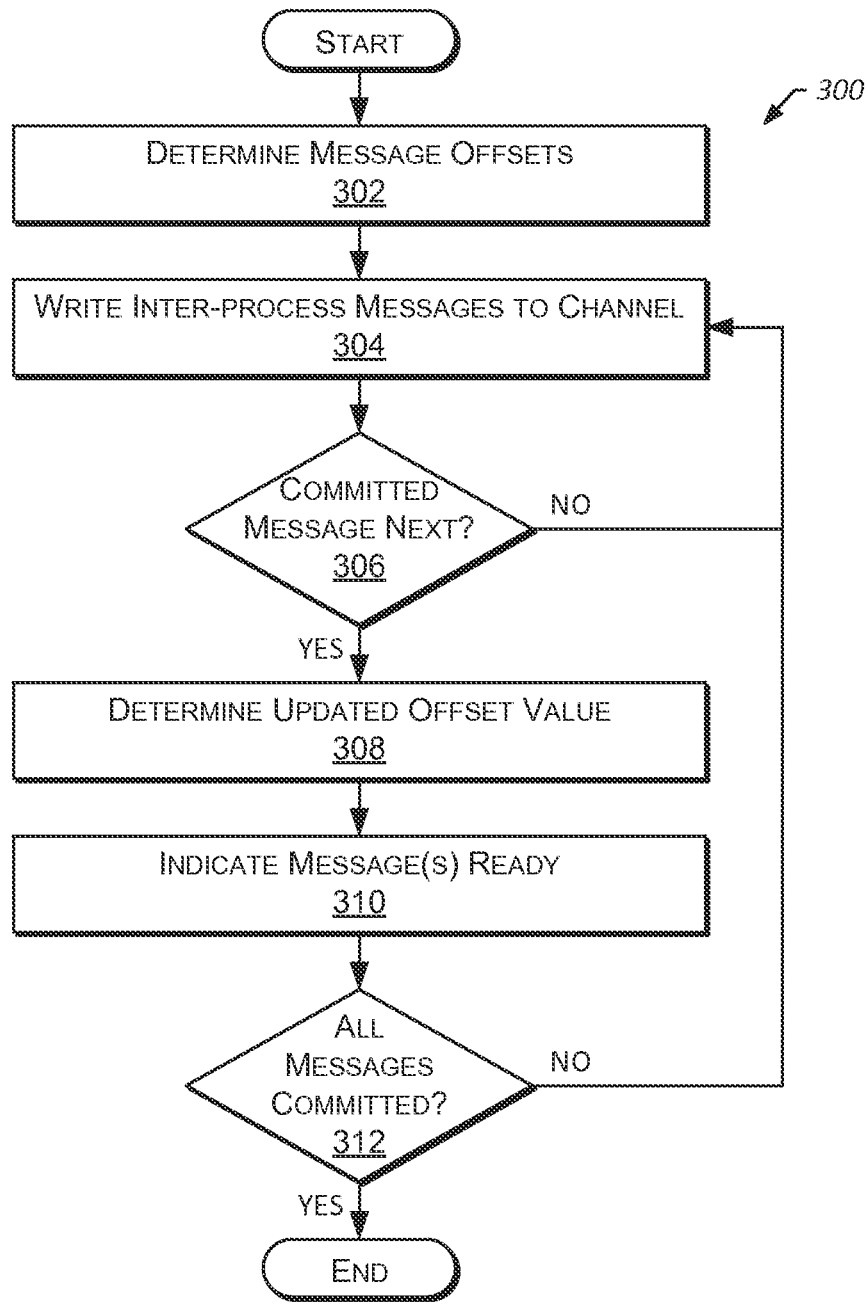
FIG. 3 is a flowchart that illustrates a method of transmitting inter-process messages in accordance with one or more embodiments.
Figure 4:
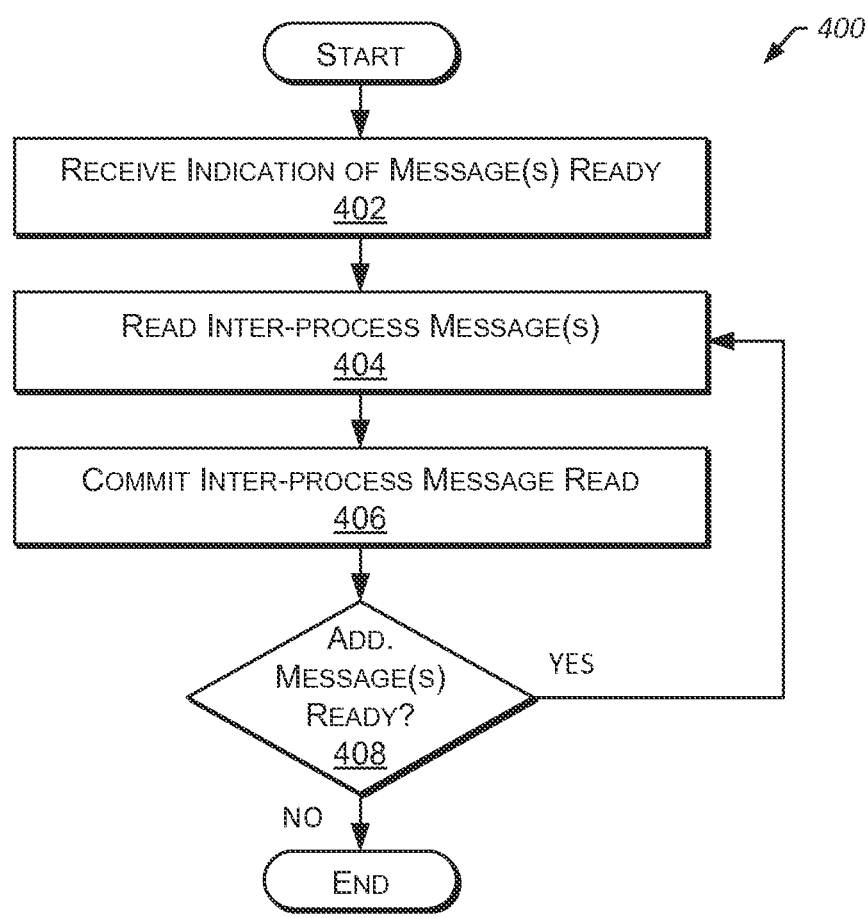
FIG. 4 is a flowchart that illustrates a method of receiving inter-process messages in accordance with one or more embodiments.

In some embodiments, exchanging inter-process messages via the channel (block 206) includes the sending process 102a transmitting one or more inter-process messages via the channel 104 (e.g., as described herein with regard to at least method 300 of FIG. 3), and the receiving process 102b receiving one or more inter-process messages via the channel 104 (e.g., as described herein with regard to at least method 400 of FIG. 4).

FIG. 3 is a flowchart that illustrates a method 300 of transmitting (or sending) inter-process messages in accordance with one or more embodiments. Method 300 may be carried out, for example, by the sending process 102a. FIG. 4 is a flowchart that illustrates a method 400 of receiving (or reading) inter-process messages in accordance with one or more embodiments. Method 400 may be carried out, for example, by the receiving process 102b.

Method 300 may generally include determining message offsets (block 302), writing inter-process messages to the channel (block 304), and determining whether a committed message is the next message to be read according to a specified sequence (block 306). Method 300 may also include in response to determining that the committed message is the next message of the specified sequence, determining an updated offset value (block 308), providing an indication that message(s) are ready (block 310), and determining whether all of the messages to be exchanged have been committed (block 312). Method 300 may also include, in response to determining that all of the messages to be exchanged have been committed, ending the transmission process, or continuing the process if all of the messages to be exchanged have not yet been committed.

Referring to the method 300 of FIG. 3, in some embodiments, determining message offsets (block 302) includes the sending process 102a determining a message offset value for the inter-process messages 110 to be exchanged. In some embodiments, the message offset values for inter-process messages 110 correspond to the locations of the ends of the buffers 120 allocated for the inter-process messages 110. For example, with regard to messages A, B and C corresponding to 100-byte upper bound message sizes, the sending process 102a may determine the corresponding message offset values to be byte 99, byte 199 and byte 299 of the circular buffer 114. Thus, the first allocated buffer 120a may correspond to bytes 0-99, the second allocated buffer 120b may correspond to bytes 100-199, and the third allocated buffer 120c may correspond to bytes 200-299.

In some embodiments, writing inter-process messages to the channel (block 304) includes the sending process 102a writing each of the plurality of inter-process messages 110 to the respective portions of the shared memory 112 reserved for the inter-process message 110. Writing the plurality of inter-process messages 110 to the allocated portions of the shared memory 112 may include, for example, the sending process 102a reserving the first buffer 120a (e.g., bytes 0-99) for message A on-demand, and writing message A to the first buffer 120a; reserving the second buffer 120b (e.g., bytes 100-199) for message B on-demand, and writing message B to the second buffer 120b; and reserving the third buffer 102c (e.g., bytes 200-299) for message C on-demand, and writing message C to the third buffer 102c. In some embodiments, the message headers are written and completed before the memory is released to the sending process 102a. This may make it safe for receiving process 102b to access the buffers 120 and "temporarily skip" non-committed messages. That is, the receiving process 102b may see the allocated blocks of memory associated with the written headers, but not see that all of the content is there or otherwise available for a message until the committed indicator of the header for the message is set. In some embodiments, allocation of the buffers can be done sequentially, and after that the writing of individual messages can occur in any suitable order (e.g., in parallel). In some embodiments, when allocating a memory space (e.g., a buffer) for a message, the bytes immediately following the allocated space are cleared, so that the receiving process 102b can safely check if there's something after the memory space. In such an embodiment, a cleared (e.g., zeroed) byte immediately following the allocated space indicates there is nothing in the next memory space (e.g., it is an invalid header).

In some embodiments, some or all of the write operations include an atomic write operation. In some embodiments, writing each of the plurality of inter-process messages 110 to the respective portions of the shared memory 112 reserved for the inter-process message 110 includes writing two or more of the messages in parallel (e.g., writing some or all of the data of at least two inter-process messages 110 simultaneously). Writing each of the plurality of inter-process messages 110 to the respective portions of the shared memory 112 reserved for the inter-process messages 110 may include, for example, the sending process 102a writing at least a portion of the messages A, B and/or C to the respective first buffer 120a, the second buffer 120b and/or the third buffer 120c at the same time. Such parallel writing may help data throughput because the first process 102a does not have to wait for the writing of an inter-process message 110 to one buffer 120 to complete before writing another inter-process message 110 to another buffer 120.

In some embodiments, writing inter-process messages to the channel includes the sending process 102*a* updating a status indicating that a message has been committed (e.g., in response to completing the writing of the message or otherwise determining that the message has been committed). In some embodiments, updating a status indicating that a message has been committed includes the sending process 102*a* deterministically modifying a commit indicator (e.g., a commit flag or commit Boolean value) in a header of the committed inter-process message 110. The commit indicator may be changed from a first value that indicates that the inter-process message 110 has not yet been committed to the corresponding buffer 120 to a second value that indicates that the inter-process message 110 has been committed to the corresponding buffer 120. If message A has been committed to the first buffer 120*a*, for example, then updating a status indicating that the writing of the message has been completed may include the sending process 102*a* changing a "message committed" indicator in the header of message A in the first buffer 120*a* from a value of "0" (e.g., indicating that message A has not yet been committed to the first buffer 120*a*) to a value of "1" (e.g., indicating that message A has been committed to the first buffer 120*a*). A similar process may be completed for the "message committed" indicator -in the headers of messages B and C upon the respective messages B and C being committed to the second buffer 120*b* and the third buffer 120*c* respectively.

In some embodiments, the sending process 102*a* may indicate whether or not a message can be read out of order. For example, if the sending process 102*a* is writing the messages A, B, C and D to the circular buffer 114, and D can be read at any time (e.g., before or after any of message A, B or C), then the writing process 102*a* may set a sequence indicator, (e.g., a sequence flag or sequence Boolean value) in the header of the message D, to indicate that it can be read out of order (e.g., message D can be read out of sequence). The writing process 102*a* may set a sequence indicator, (e.g., a sequence flag or sequence Boolean value) in the header of the messages A, B and C to indicate that the messages cannot be read out of order (e.g., they should be read in sequence). As discussed below, this may enable the receiving process 102*b* to read message D when the message is committed, without regard to a read order.

In some embodiments, the sending process 102*a* may indicate a priority for a message. For example, if the sending process 102*a* is writing the messages A, B, C, D and E to the circular buffer 114, and message A is of a low priority, message B is of a medium priority, message D is of a high priority, and message E is of a low priority, then the writing process 102*a* may set a priority value, or other indicator, in the header of each of the messages A, B, C, D and E, to indicate the message's respective priority level (e.g., the header of message A will include a priority value indicative of a low priority, the header of message B will include a priority value indicative of a medium priority, and so forth). As discussed below, this may enable the receiving process 102*b* to selectively read messages based on a priority level of the message.

In some embodiments, determining whether a committed message is the next message to be read according to a specified sequence (block 306) includes the sending process 102*a* determining whether all of the inter-process messages 110 preceding a committed inter-process message 110 (e.g., in a specified sequence) have already been committed. If, for example, the sending process 102*a* determines that message A has been committed to the first buffer 120*a*, and messages A, B and C are to be read in the order of A-B-C, then determining whether the message is the next message in the sequence may include the sending process 102*a* determining that message A is the next inter-process message 110 in the sequence because message A is the first message of the sequence A-B-C and, thus, there are no preceding inter-process messages 110 that have not yet been committed to their respective buffers 120. If, for example, the sending process 102*a* determines that message B has been committed to the second buffer 120*b*, message A has already been committed to the first buffer 120*a* (e.g., the "message committed" indicator in the header of message A in the first buffer 120*a* has a value of "1"), and messages A, B and C are to be read in the order of A-B-C, then determining whether the message is the next message in the sequence may include the sending process 102*a* determining that message A has already been committed (e.g., by reading the value of "1" for the "message committed" indicator in the header of message A in the first buffer 120*a*) and determining that message B is the next inter-process message 110 in the sequence because message A (the only inter-process message 110 before message B in the sequence A-B-C) has already been committed and, thus, there are no preceding inter-process messages 110 in the sequence that have not yet been committed. If, for example, the sending process 102*a* determines that message C has been committed to the third buffer 120*c*, message B has already been committed to the second buffer 120*b* (e.g., the "message committed" indicator in the header of message B in the second buffer 120*b* has a value of "1"), message A has not yet been committed to the first buffer 120*a* (e.g., the "message committed" indicator in the header of message A in the first buffer 120*a* has a value of "0"), and messages A, B and C are to be read in the order of A-B-C, then determining whether the message is the next message in the sequence may include the sending process 102*a* determining that message A has not yet been committed (e.g., by reading the value of "0" for the "message committed" indicator in the header of message A in the first buffer 120*a*) and determining that message C is not the next inter-process message 110 to be read (e.g., by the receiving process 102*b*) because at least one of the inter-process messages 110 before message C in the sequence A-B-C (e.g., message A) has not yet been committed.

In some embodiments, determining an updated offset value (block 308) includes (e.g., in response to determining that the message is the next message in the sequence (block 306)) the sending process 102*a* determining an offset value corresponding to the buffer end for a contiguous set of inter-process messages 110 that have been committed. For example, if message C has already been committed to the buffer 120*c*, message B has not yet been committed to the second buffer 120*b*, message A is subsequently committed to the first buffer 120*a*, and it is determined that message A is the next message in the sequence A-B-C, then determining an updated offset value may include process 102*a* determining an updated offset value corresponding to byte 99 of the circular buffer 114 (e.g., a value corresponding to the buffer end 124*a* of the first buffer 120*a* storing message A). If, for example, messages A and C have already been committed to respective buffers 120*a* and 120*c*, message B is subsequently committed to the second buffer 120*b*, and it is determined that message B is the next message in the sequence A-B-C, then determining an updated offset value may include process 102*a* determining an updated offset value corresponding to byte 299 of the circular buffer 114 (e.g., a value corresponding to the third buffer end 124*c* of the third buffer 120*c* storing message C). In some embodiments, the location in a buffer may alternate between positive and negative values as the locations wrap about the circular buffer. If, for example, the circular buffer 114 is 800 bytes in size, then the first cycle through the circular buffer 114 may be represented by positive values (e.g., 0 to 799), the second cycle through the circular buffer 114 may be represented by negative values (e.g., −0 to −799), the third cycle through the circular buffer 114 may be represented by positive values (e.g., 0 to 799), and so forth.

The offset value corresponding to the messages written may be referred to as a "master write offset." As described herein, a second offset value corresponding to the messages read may be referred to as a "master read offset." The master write offset may be read or otherwise provided to the receiving process 102b, and indicate a point (e.g., in the circular buffer 114) up to which the process 102b can be read. The master read offset may be read or otherwise provided to the sending process 102a, and indicate a point (e.g., in the circular buffer 114) up to which the process 102b can write. In some embodiments, the offset values wrap to negative every other round. Accordingly, if a master read offset value is negative and the master write offset value for it is positive, it can be determined that the read and write processes are on different rounds of the circular buffer 114. In some embodiments, the integer write/reads are atomic. A negative bit may provide a "two-in-one" variable, with both a Boolean and offset. In some embodiments, when the circular buffer 114 has wrapped and writing is performed to offsets smaller than a master read offset, allocation may not be allowed all the way up to the master read offset. At least enough space for a redirect pointer (e.g., placeholder message for redirecting or jumping to another buffer 120) may be reserved such that it cannot be allocated. Thus, for example, even if there is 100 bytes available and the message size is 98 bytes, writing may not be allowed to that space, because the remaining 2 bytes would not be large enough to fit the 16-byte special message. The channel may not be able to operate if a new message would need to be written.

In some embodiments, determining an updated offset value after determining an inter-process message 110 has been committed includes determining whether the writing has been completed for one or more inter-process messages 110 immediately following the inter-process message 110 in the specified sequence, and if so, determining an updated offset value corresponding to the end of the one or more inter-process messages 110. If, for example, the sending process 102a determines that message A has been committed to memory, and messages A, B and C are to be read in the order of A-B-C, then determining whether the writing has been completed for one or more inter-process messages 110 immediately following the inter-process message 110 in the specified sequence may include the sending process 102a reading the "message committed" indicator value in the header of message B to determine whether message B has been committed to the second buffer 120b. If message B has not yet been committed (e.g., the "message committed" indicator value in the header of message B is "0"), then the sending process 102a may determine that the writing has not been completed for one or more messages immediately following message A in the specified sequence and, thus may also determine an updated offset value corresponding to byte 99 of the circular buffer 114 (e.g., a value corresponding to the buffer end 124a of the first buffer 120a storing message A). If, however, message B has already been committed (e.g., the "message committed" indicator value in the header of message B in the second buffer 120b is "1"), then the sending process 102a may determine that the writing has been completed for at least one message (e.g., message B) immediately following/after message A in the specified sequence and, thus, may determine an updated offset value corresponding to byte 199 of the circular buffer 114 (e.g., a value corresponding to the buffer end 124b of the second buffer 120b storing message B). If both messages B and C have already been committed (e.g., the "message committed" indicator value in the header of messages B and C are both "1"), then the sending process 102a may determine that the writing has been completed for one or more inter-process messages 110 (e.g., for messages B and C) immediately following message A in the specified sequence and, thus, may determine an updated offset value corresponding to byte 299 of the circular buffer 114 (e.g., a value corresponding to the buffer end 124c of the third buffer 120c storing message C). If message C has been committed (e.g., the "message committed" indicator value in the header of message C is "1"), but message B has not yet been committed (e.g., the "message committed" indicator value in the header of message B is "0"), then the sending process 102a may determine that the writing has not been completed for one or more inter-process messages 110 immediately following message A in the specified sequence and, thus, may determine an updated offset value corresponding to byte 99 of the circular buffer 114 (e.g., a value corresponding to the buffer end 124a of the first buffer 120a storing message A). In some embodiments, determining an updated offset value includes determining that the writing has been completed for one or more consecutive ones of the plurality of messages immediately following the one of the plurality of messages in the specified sequence, and determining an updated offset value corresponding to the end of the one or more consecutive ones of the plurality of messages.

In some embodiments, providing an indication that one or more messages are ready (block 310) includes the sending process 102a alerting the receiving process 102b that one or more additional messages are committed and ready to be read by the receiving process 102b. In some embodiments, providing an indication that message(s) are ready includes the sending process 102a sending a "wake-up" signal or trigger to the receiving process 102b and/or providing the updated or updated offset value to the receiving process 102b. In some embodiments, providing an indication that one or more messages are ready includes the sending process 102b writing a value indicating that a message is ready to a location in shared memory (e.g., a header for the channel, or other shared memory location accessible by the reading process 102b), and the receiving process 102b may be alerted that the message is ready based on reading the value from the shared memory. For example, the writing process 102a may write the updated offset value (e.g., the master write offset), or other value indicating that the message is ready to be read, to a header for the channel, and the reading process 102b can read the updated offset value to determine that the message is ready to be read. The updated offset value may serve as a write pointer, indicating the extent or limit in the circular buffer 114 to which the receiving process 102b can read the message data stored therein. As discussed herein, upon being alerted that one or more additional messages are committed and ready to be read by the receiving process 102b, the receiving process 102b may begin or continue to read (e.g., up to the updated offset value), message data for the one or more inter-process messages 110 in the sequence that have been committed but have not yet been read. For example, the receiving process 102b may receive the updated offset value, and read the one or more messages that reside in the portion of the circular buffer 114 before the updated offset value. If, for example, message A has been committed, but messages B and C have not yet been committed, then the sending process 102*a* may send a "wake-up" signal to the receiving process 102*b* and/or provide an updated offset value corresponding to byte 99 of the circular buffer 114 (e.g., a value corresponding to the buffer end 124*a* of the first buffer 120*a* storing message A) to the receiving process 102*b*, and the receiving process 102*b* may read the message data that resides in bytes 0-99 of the circular buffer 114 (e.g., the committed message data for message A). If, for example, message C is subsequently committed, but message B has not yet been committed, then the sending process 102*a* may not send a new "wake-up" signal to the receiving process 102*b* or provide an updated offset value because the next inter-process message 110 in the sequence (e.g. message B) has not yet been committed and, thus, the offset value has not yet changed. If, for example, message B is subsequently committed, such that messages A, B and C have all been committed, then the sending process 102*a* may send a "wake-up" signal to the receiving process 102*b* and/or provide an updated offset value corresponding to byte 299 of the circular buffer 114 (e.g., a value corresponding to the buffer end 124*c* of the third buffer 120*c* storing message C) to the receiving process 102*b*, and the receiving process 102*b* may read the message data that resides in bytes 0-299 of the circular buffer 114 (e.g., the committed message data for messages A, B and C).

In some embodiments, a writing process (e.g., including blocks 304-312) is repeated until the offset value reaches a value that corresponds to the end of the messages to be written. If, for example, messages A, B and C are to be read in the order of A-B-C, then the writing and monitoring process may be repeated until the offset value is updated to a value corresponding to byte 299 (e.g., a value corresponding to the buffer end 124*c* of the third buffer 120*c* storing message C). At this point, all of the message data for the inter-process messages 110 to be exchanged (e.g., the data for messages A, B and C) is committed to the circular buffer 114 of the shared memory 112 and is ready to be read by the receiving process 102*b*.

FIG. 4 is a flowchart that illustrates a method 400 of receiving (or reading) inter-process messages in accordance with one or more embodiments. The method 400 may generally include receiving an indication that messages are ready (block 402), reading inter-process messages (block 404), committing the inter-process message read (block 406), and determining whether additional messages are ready (block 408). Method 400 may include repeating the process of reading messages that are ready (block 404) and committing the inter-process message read (block 406) (e.g., in response to determining that an additional message is ready), and/or ending the current read process in response to determining that an additional message is not ready.

In some embodiments, receiving an indication that messages are ready (block 402) includes the receiving process 102*b* receiving (e.g., from the sending process 102*a*) an alert indicating that one or more messages are committed and ready to be read by the receiving process 102*b*. The alert may include, for example, a "wake-up" signal or trigger and/or a current or updated offset value that corresponds to the most recent offset value determined by the sending process 102*a*. If, for example, messages A, B and C are to be read in the order of A-B-C, only message A has been committed, and the sending process 102*a* determines an offset value corresponding to byte 99 of the circular buffer 114 (e.g., a value corresponding to the buffer end 124*a* of the first buffer 120*a* storing message A), then receiving an indication that messages are ready may include the receiving process 102*b* receiving, from the sending process 102*a*, a "wake-up" signal and/or an updated offset value corresponding to byte 99 of the circular buffer 114. In an embodiment in which, the sending process 102*a* simply writes a value indicating that a message is ready to a location in shared memory (e.g., writes the updated offset value or other value to a header for the channel), receiving an indication that messages are ready may include the receiving process 102*b* reading the value from the shared memory. The reading of the value may alert the reading process 102*b* to the fact that the message is ready to be read. If, for example, messages A, B and C are to be read in the order of A-B-C, only message A has been committed, and the sending process 102*a* determines an offset value corresponding to byte 99 of the circular buffer 114 (e.g., a value corresponding to the buffer end 124*a* of the first buffer 120*a* storing message A), then receiving an indication that messages are ready may include the receiving process 102*b* reading the updated offset value corresponding to byte 99 of the circular buffer 114 from the header for the channel in shared memory.

In some embodiments, reading inter-process messages (block 404) includes the receiving process 102*b* reading, from the shared memory 112, the message data for committed inter-process messages 110 that reside in a portion of the shared memory 112 before the offset value. If, for example, the last offset value received by the receiving process 102*b* corresponds to byte 99 of the circular buffer 114, then reading the inter-process messages may include the receiving process 102*b* reading the message data for message A because it resides in bytes 0-99 of the circular buffer 114. At this point, however, the receiving process 102*b* may not, however, include reading messages B and C because they reside in bytes 100-299 of the circular buffer 114. If, for example, the last offset value received by the receiving process 102*b* corresponds to byte 199 of the circular buffer 114, then reading the inter-process messages may include the receiving process 102*b* reading the message data for messages A and B because it resides in bytes 0-199 of the circular buffer 114. At this point, however, the receiving process 102*b* may not, however, include reading message C because it resides in bytes 200-299 of the circular buffer 114. If, for example, the last offset value received by the receiving process 102*b* corresponds to byte 299 of the circular buffer 114, then reading the inter-process messages may include the receiving process 102*b* reading the message data for messages A, B and C because it resides in bytes 0-299 of the circular buffer 114.

In some embodiments, reading the inter-process messages 110 that reside in a portion of the shared memory 112 before the offset value includes reading one or more of the inter-process messages 110 in parallel (e.g., reading some or all of the message data for at least two messages simultaneously). Reading the plurality of inter-process messages 110 from the allocated portions of the shared memory 112 may include, for example, the receiving process 102*b* reading at least a portion of the message data for two or more of messages A, B and C from the respective first, second and third buffers 120*a*, 120*b* and 120*c* at the same time. In some embodiments, some or all of the read operations includes an atomic read operation. If, for example, the last offset value received by the receiving device corresponds to byte 199 of the circular buffer 114 (e.g., the end of the second buffer 120*b* storing message B), then reading the inter-process messages 110 may include the receiving process 102*b* reading at least a portion of the messages A and B from the respective first and second buffers 120*a* and 120*b* in parallel. If, for example, the last offset value received by the receiving process 102*b* corresponds to byte 299 of the circular buffer 114 (e.g., the end of the third buffer 120*c* storing message C), then reading the messages may include the receiving process 102*b* reading at least a portion of the messages A, B and C from the respective first, second and third buffers 120a, 120b and 120c in parallel. When reading in parallel, if offset values are to be written from multiple process threads, this can be accomplished by consecutive writing and checking/reading. If, for example, the read-back value does not match, it can be determined that another process tried to write at the same time. If the other value was larger, the process can stop, since the greater value already covers this message. If the other value was smaller, the process can retry. In some embodiments, the message data received (e.g., from the sending process 102a) for writing to a buffer can be passed to a consumer (e.g., another process) and while that consumer is processing the message, while the other messages (e.g., the next message) can be written and/or read in parallel. After the consumer has processed the message data, it can set the commit indicator for that message, and the set commit indicator can be used by the reading process 102b to identify it as a new written message to be read.

In some embodiments, reading inter-process messages includes the receiving process 102b identifying a committed message 110 with the highest priority, and reading that message from the shared memory 112. For example, if the sending process is writing the messages A, B, C, D and E to the circular buffer 114, and message A is complete and of a low priority, message B is incomplete and of a medium priority, message D is complete and of a high priority, and message E is complete and of a low priority, then the receiving process 102b may read message D (e.g., the highest priority committed message) from the shared memory 112. If no changes have taken place by the time the receiving process 102b completes reading message D, then, in the next read iteration (e.g., the next iteration of block 404 of method 400), the receiving process 102b may read message A or E (e.g., now the highest priority committed messages) from the shared memory 112. In some embodiments, messages A and E may be read in parallel since they are of the same priority.

The reading process 102b may determine each of the message's status and priority based on the commit indicator and priority value in the headers of the respective messages in the shared memory 112. In some embodiments, the receiving process 102b may -scan the messages to read by checking the buffer start locations (e.g., buffer start locations 122a, 122b, and so forth) to determine if any data is present in each of the buffers 120 and, in response to determining that data is present at the start of a buffer 120 (e.g., indicating that at least a portion of a message is written to the associated with buffer 120), the receiving process 102b may check the commit indicator in the header of the message in the buffer 120 to determine if the message is ready to be read and, if the message in the buffer 120 is ready to be read, the receiving process 102b may also check the priority value to determine the priority of the committed message in the buffer 120 and/or the sequence indicator value to determine whether the message can be read out of order. The reading process 102b may do this for each of the allocated buffers 120 (e.g., checking each of the buffer start locations 122a, 122b, and so forth), keeping track of the messages that have been committed and their respective priorities. The reading process 102b, may, then select and read the highest priority committed message(s) that can be read. For example, if the commit indicators indicate that only messages D and E are complete, the priority value for message D indicates that message D is of high priority but the sequence indicator for message D indicates that message D cannot be read out of sequence, and the priority value for message E indicates that message E is of low priority but the sequence indicator for message E indicates that message E can be read out of sequence, then the receiving process 102b may read message E from the shared memory 112 based on the fact that the messages preceding message D have not yet been read, and, thus, despite message D having a higher priority than message E, it cannot be read out of sequence.

In some embodiments, committing the inter-process message read (block 406) includes the receiving process 102b releasing the allocated sub-portions of the shared memory 112 corresponding to the inter-process messages 110 that have been read. For example, releasing the portion of the channel allocated to the inter-process messages that have been read may include the receiving process 102b releasing the buffer(s) 120 that correspond to the inter-process messages 110 that have already been read. Thus, the memory space may be made available for use by other processes. If, for example, message A has been read by the receiving process 102b, releasing the portion of the channel allocated to the inter-process messages 110 that have been read may include the receiving process 102b releasing the first buffer 120a (e.g., bytes 0-99 of the circular buffer 114) such that the memory space is available for use by other processes. Thus, for example, another process 102 may allocate some or all of bytes 0-99 of the circular buffer 114 for storing another inter-process message 110 that is exchanged with another receiving process 102b. In some embodiments, committing the inter-process message read (e.g., releasing the portion of the channel allocated to the inter-process messages that have been read) may not require, or otherwise involve, actively deleting or otherwise clearing data from the shared memory 112. For example, the allocated portions of shared memory 112 may be released by reading process 102b, providing an indication of the point to which reading has been completed, and thereby indicating the point to which data can be overwritten in the shared memory 112. That is, the reading process 102b may indicate a point in the shared memory 112 for which it is acceptable to overwrite data preceding that point in the shared memory 112. For example, if the receiving process 102b has read all data through byte 199 of the circular buffer 114, committing the inter-process message read may include the receiving process 102b updating a read pointer (e.g., the master read offset) in a header for the channel to correspond to byte 199 of the circular buffer 114 such that other processes can read the value to determine that the space preceding byte 199 of the circular buffer 114 is available to be overwritten. Thus, committing the inter-process message read may not require, or otherwise involve, actively deleting or otherwise clearing data from the shared memory 112.

In some embodiments, determining whether additional messages are ready (block 408) includes the receiving process 102b determining whether the offset value has changed (e.g., a new or updated offset value has been received from the sending process 102a). If, for example, message A is committed and the initial offset value corresponds to byte 99 of the circular buffer 114, but message B has not yet been committed, such that the sending process 102a has not sent an updated offset value to the receiving process 102b, then determining whether additional messages 110 are ready may include the receiving process 102b determining that the offset value has not changed and, thus, the additional inter-process messages 110 are not ready to be read. In response to determining that an additional inter-process message 110 is not ready to be read, the receiving process 102b may continue to read the inter-process messages 110 that are committed and ready to be read. Continuing with the above example, the receiving process 102b may continue to read message A. If, for example, message A is committed and the initial offset value corresponds to byte 99 of the circular buffer 114, and messages B and C are subsequently committed, such that the sending process 102a sends an updated offset value that corresponds to byte 299 of the circular buffer 114, then the receiving process 102*b* may determine that the offset value has changed and, thus, that additional inter-process messages 110 are ready to be read. In response to determining that an additional inter-process message 110 is not ready to be read, the receiving process 102*b* may continue to read the inter-process messages 110 that are committed and ready to be read including the additional inter-process messages 110 that correspond to the updated offset value. Continuing with the above example, the receiving process 102*b* may continue to read message A, and begin reading messages B and C. In some embodiments, if the receiving process 102*b* has not yet received an indication that all of the messages in the sequence are ready (e.g., at least one inter-process message 110 still needs to be committed), then determining whether additional messages are ready may include the receiving process 102*b* waiting for a given duration for such an indication before ending the process. Returning to the above example, if message A is committed and the initial offset value corresponds to byte 99 of the circular buffer 114, but message B has not yet been committed, such that the sending process 102*a* has not sent an updated offset value, then the receiving process 102*b* may initially determine that the offset value has not changed and, thus, the additional inter-process messages 110 are not ready to be read, but the receiving process 102*b* may wait for a given duration (e.g., 1 millisecond (ms)) to receive an updated offset value or busy-loop N times (e.g., loop 2 times with a 0.5 ms "for" or "while" loop). If the offset value is updated during that period, the receiving process 102*b* may, then, proceed to reading the message data corresponding to the updated offset value. If, for example, messages B and C are committed and the sending process 102*a* sends an updated offset value corresponding to byte 299 of the circular buffer 114 during the time the receiving process is waiting (e.g., at 0.5 ms), then the receiving process 102*b* may proceed to read the message data for messages B and C residing in the circular buffer 114 (e.g., the message data up to byte 299 of the circular buffer 114). If, for example, message B is not committed and the sending process 102*a* does not send an updated offset value during the time the receiving process is waiting (e.g., does not send an updated offset value within the 1 ms), then the receiving process 102*b* may proceed to exit the read process. In some embodiments, the receiving process may not employ the waiting period if the offset value already corresponds to the end of the message sequence. For example, in the iteration following the reading of the message data for messages B and C from the circular buffer 114, the receiving process 102*b* may not institute the wait for an updated offset value because no change is expected. Such a waiting period may lower overhead at least in the instances when an offset value is updated in the waiting period because the receiving process 102*b* may not have to exit the read process and subsequently restart the read process when the offset value is updated and/or a trigger signal is received. In some embodiments, receiving inter-process messages includes (e.g., in response to determining that the offset value has changed and/or receiving a trigger signal): (1) obtaining a current offset value corresponding to the most recent offset value determined by the sending process 102*a*; (2) reading, from the shared memory 112, the inter-process messages 110 that reside in (e.g., are stored in) a portion of the shared memory 112 (e.g., the respective buffers 120) before the offset value; and/or (3) releasing the allocated sub-portions of the shared memory 112 (e.g., the respective buffers 120) corresponding to the inter-process messages 110 that have been read. If the offset value changes from the initial offset value that corresponds to byte 99 of the circular buffer 114 to an updated offset value that corresponds to byte 299 of the circular buffer 114, then the receiving process 102*b* may proceed with reading messages B and C, and releasing the corresponding portions of the circular buffer as the reading of messages A, B and C completes.

In some embodiments, determining whether additional messages are ready includes determining whether any messages that are to be read according to the sequence and/or any messages that can be read out of sequence are committed and, thus, ready to be read. The reading process 102*b* may, for example, determine whether any messages are ready to be read based on the commit indicators and the sequence indicators of the message headers already written to the shared memory 112. In some embodiments, the receiving process 102*b* may scan the messages to read by checking the buffer start locations (e.g., buffer start locations 122*a*, 122*b*, and so forth) to determine if any data is present in each of the buffers 120 and, in response to determining that data is present at the start of a buffer 120 (e.g., indicating that at least a portion of a message is written to the associated buffer 120), the receiving process 102*b* may check the commit indicator in the header of the message to determine if the message in the buffer 120 is ready to be read and, if the message in the buffer 120 is ready to be read, then the receiving process 102*b* may also check the sequence indicator value to determine whether the message can be read out of order. The reading process 102*b* may do this for each of the allocated buffers 120 (e.g., checking each of the buffer start locations 122*a*, 122*b*, and so forth). If the reading process 102*b* determines that at least one message is committed that is next in the read sequence, or at least one message is committed that can be read out of sequence, then the reading process 102*b* may return to the process of reading inter-process messages (block 404). For example, if the reading process 102*b* completes reading message A, messages B and C are not yet committed, the commit indicator for message D indicates that writing of message D has been completed and the sequence indicator for message D indicates that message D can be read out of sequence, then the receiving process 102*b* may determine (e.g., based on the commit and sequence indicators in the header of message D) that an additional message is ready to be read (e.g., message D is ready to be read), and may proceed to another iteration of reading inter-process messages(s) (e.g., as discussed with regard to block 404).

It will be appreciated that the methods 200, 300, and 400 are exemplary embodiments of methods that may be employed in accordance with the techniques described herein. The methods 200, 300, and 400 may be modified to facilitate variations of their implementations and uses. The order of the methods 200, 300, and 400 and the operations provided therein may be changed, and various elements may be added, reordered, combined, omitted, modified, etc. Portions of the methods 200, 300, and 400 may be implemented in software, hardware, or a combination thereof. Some or all of the portions of the methods 200, 300, and 400 may be implemented by one or more of the processors/modules/applications described herein.

Figure 5:
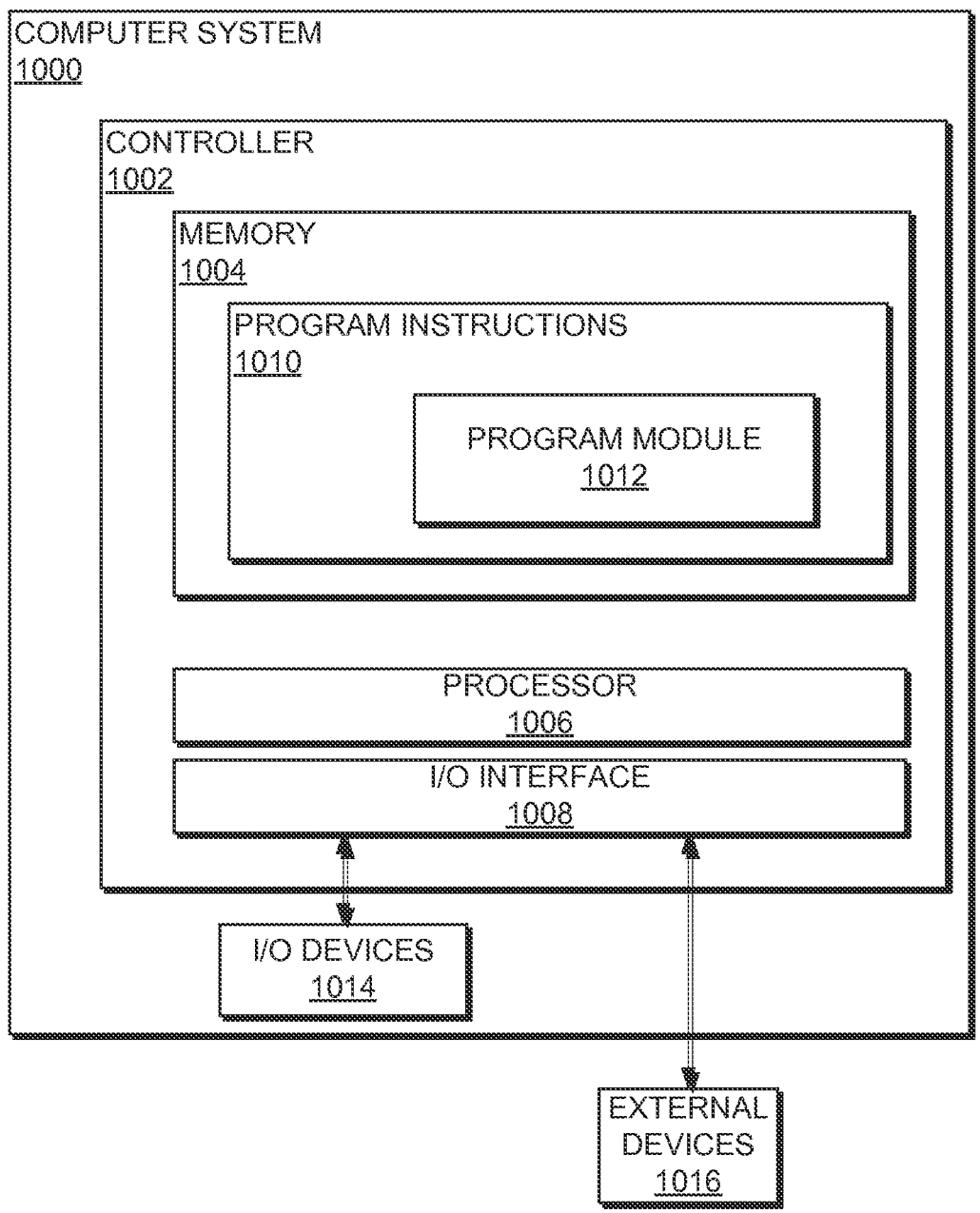
FIG. 5 is a diagram that illustrates an exemplary computer system in accordance with one or more embodiments.

FIG. 5 is a diagram that illustrates an exemplary computer system 1000 in accordance with one or more embodiments. In some embodiments, the computer system 1000 includes a controller 1002 for controlling the operational aspects of the computer system 1000. In some embodiments, the controller 1002 includes a memory 1004, a processor 1006, and an input/output (I/O) interface 1008. The memory 1004 may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), and/or the like. The memory 1004 may include a non-transitory computer-readable storage medium having program instructions 1010. The program instructions 1010 may include program modules 1012 (e.g., including subsets of program instructions 1010) that are executable by a computer processor (e.g., the processor 1006) to cause the functional operations (e.g., methods/routines/processes) described herein, including those described with regard to the processes 102 (e.g., the sending and receiving processes), and the methods 200, 300, and 400. The program instructions 1010 may include, for example, program modules 1012 such as an inter-process message sending module (e.g., for performing some or all of the operational aspects of methods 200 and 300 described herein with regard to FIGS. 2 and 3), and/or an inter-process message receiving module (e.g., for performing some or all of the operational aspects of the methods 200 and 400 described herein with regard to at least FIGS. 2 and 4).

The processor 1006 may be any suitable processor capable of executing/performing program instructions. The processor 1006 may include a central processing unit (CPU) that carries out program instructions (e.g., program instructions of the program module(s) 1012) to perform arithmetical, logical, and input/output operations described herein. The processor 1006 may include one or more processors.

The I/O interface 1008 may provide an interface for communication with one or more I/O devices 1014, such as a mouse/keyboard/touchscreen, a graphical user interface (GUI) (e.g., a display), and/or the like. A display may include a suitable electronic display. Devices may be connected to the I/O interface 1008 via a wired or a wireless connection. The I/O interface 1008 may provide an interface for communication with one or more external devices 1016, such as other computers, networks and/or the like.

In some embodiments, the sending process 102a and the receiving process 102b may be processes executed by the same processor. For example, the sending and receiving processes may include two processing threads executing on a single processor 1006 of computer system 1000. In some embodiments, the sending process 102a and the receiving process 102b may be executed by different processors of the same computer system. For example, the sending process 102a may include a first thread executing on a first processor 1006 of the processor 1006 of the computer system 1000, and the receiving process 102b may include a second thread executing on a second processor of the processor 1006 of the computer system 1000. In some embodiments, the sending process 102a and the receiving process 102b may be executed by different processors of different computer systems. For example, the sending process 102a may include a first thread executing on a processor 1006 of a first computer system 1000, and the receiving process 102b may include a second thread executing on a processor 1006 of a second computer system 1000.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. As used throughout this application, the term "from" does not limit the associated operation to being directly from. Thus, for example, receiving an item "from" an entity may include receiving an item directly from the entity or indirectly from the entity (e.g., via an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A method of inter-process messaging, the method comprising:

determining a size for inter-process messages to be transmitted from a first computer process to a second computer process, wherein the inter-process messages are configured to be read by the second computer process in a specified sequence;

creating a channel for transmitting the inter-process messages from the first computer process to the second computer process, the channel comprising an allocated portion of a shared circular buffer in a shared memory that is (a) of the determined size and (b) comprises buffers reserved for receiving respective ones of the plurality of inter-process messages; and a sending process of a computer device:

writing the inter-process messages in parallel to the buffers reserved for receiving respective ones of the plurality of inter-process messages, wherein each of the inter-process messages is written to a respective one of the buffers reserved for receiving the inter-process messages;

in response to determining that the writing of one of the messages to the respective buffer reserved for the one of the inter-process messages has been completed:

modifying an indicator in a header of the one of the inter-process messages to indicate that the writing of the one of the inter-process messages to the respective buffer reserved for the one of the inter-process messages has been completed;

determining whether the one of the inter-process messages is a next inter-process message to be read by the second computer process according to the specified sequence, comprising determining that the messages that precede the one of the inter-process messages in the specified sequence have a respective header including an indicator that the message has been read; and in response to determining that the one of the messages is the next inter-process message to be read by the second computer process according to the specified sequence:

determining, whether indicators in headers of the messages indicate that the writing of one or more inter-process messages immediately following the one inter-process message in the specified sequence has been completed;

in response to determining indicators in the headers of the messages indicate that the writing of one or more inter-process messages immediately following the one inter-process message in the specified sequence has been completed, determining an offset value corresponding to a location of an end of the buffers storing the one or more inter-process messages immediately following the one inter-process message in the specified sequence for which writing has been completed; and updating an offset value in the shared memory to correspond to the determined offset value.

2. The method of claim 1, further comprising:

a receiving process of the computer device:

in response to receiving the offset value from the sending process, performing a read process comprising:

(a) identifying a current offset value corresponding to the updated offset value in the shared memory;

(b) reading, from the shared circular buffer, one or more inter-process messages that reside in a portion of the shared circular buffer before the current offset value; and (c) committing the reading of the one or more inter-process messages.

3. The method of claim 2, wherein reading, from the shared circular buffer, one or more inter-process messages that reside in a portion of the shared circular buffer before the current offset value comprises reading at least two of the one or more inter-process messages in parallel.

4. The method of claim 2, wherein the write process comprises a first thread executed by a first computer processor, and wherein the receiving process comprises a second thread executed by a second computer processor.

5. A computer system comprising:

one or more processors; and a shared memory, the one or more processors configured to execute computer-readable instructions operable for inter-process messaging comprising:

determining a size for inter-process messages to be transmitted from a first computer process to a second computer process, wherein the inter-process messages are configured to be read by the second computer process in a specified sequence;

creating a channel for transmitting the inter-process messages from the first computer process to the second computer process, the channel comprising an allocated portion of a shared circular buffer in the shared memory that is (a) of the determined size and (b) comprises buffers reserved for receiving respective ones of the plurality of inter-process messages;

writing the inter-process messages in parallel to the buffers reserved for receiving respective ones of the plurality of inter-process messages, wherein each of the inter-process messages is written to a respective one of the buffers reserved for receiving the inter-process messages; and in response to determining that the writing of one of the messages to the respective buffer reserved for the one of the inter-process messages has been completed:

modifying an indicator in a header of the one of the inter-process messages to indicate that the writing of the one of the inter-process messages to the respective buffer reserved for the one of the inter-process messages has been completed;

determining whether the one of the inter-process messages is a next inter-process message to be read by the second computer process according to the specified sequence, comprising determining that all of the messages that precede the one of the inter-process messages in the specified sequence have a respective header including an indicator that the message has been read; and in response to determining that the one of the messages is the next inter-process message to be read by the second computer process according to the specified sequence:

determining, whether indicators in headers of the messages indicate that the writing of one or more inter-process messages immediately following the one inter-process message in the specified sequence has been completed;

in response to determining indicators in headers of the messages indicate that the writing of one or more inter-process messages immediately following the one inter-process message in the specified sequence has been completed, determining an offset value corresponding to a location of an end of the buffers storing the one or more inter-process messages immediately following the one inter-process message in the specified sequence for which writing has been completed; and updating an offset value in the shared memory to correspond to the determined offset value.

6. The system of claim 5, wherein writing a first message and a second message to the shared memory comprises writing the first message and the second message to the shared memory in parallel.

7. The system of claim 5, the inter-process messaging further comprising: determining a size of the first and second messages; and allocating, for receiving the first and second messages, a portion of the shared memory that is of the determined size.

8. The system of claim 7, wherein allocating a portion of the shared memory that is of the determined size for receiving the first and second messages comprises allocating the respective first and second buffers of the shared memory.

9. The system of claim 5, wherein the offset value corresponds to an end of the buffer storing the at least one of the first and second messages for which it is determined that the writing of the message to the shared memory has been completed.

10. The system of claim 5, the inter-process messaging further comprising:

determining that writing has been completed for a third message following the one of the first and second messages in the specified sequence, wherein the offset value corresponds to an end of a buffer storing the third message.

11. The system of claim 5, the inter-process messaging further comprising: determining that writing of a third message to the shared memory has been completed before the writing of both of the first and second messages to the shared memory has been completed, wherein the third message is scheduled to be read after the first and second messages in the specified sequence; and wherein the offset value corresponds to an end of the third message.

12. The system of claim 5, the inter-process messaging further comprising: updating, by the first computer process and in response to determining that writing of one of the first and second messages to the shared memory has been completed, a message commit indicator in a header of the at least one of the first message and the second message to indicate that the writing of the at least one of the first message and the second message has been completed, wherein the second computer process is configured to read the message commit indicator in the header of the first message to determine whether the writing of the first message has been completed and read the message commit indicator in the header of the second message to determine whether the writing of the second message has been completed.

13. The system of claim 5, the inter-process messaging further comprising: writing, by the first computer process and in a header of each of the first message and the second message, a priority indicator, wherein the second process is configured to read the priority indicator from the header of the first message and the header of the second message to determine an order for reading the first and second messages.

14. The system of claim 5, the inter-process messaging further comprising: writing, by the first computer process and in a header of each of the first and second messages, a sequence indicator, wherein the second process is configured to read the sequence indicator from the header of the first message to determine whether the first message can be read out of order with respect to the specified sequence and to read the sequence indicator from the header of the second message to determine whether the second message can be read out of order with respect to the specified sequence.

15. The system of claim 5, wherein the first computer process comprises a first thread executed by a first computer processor, and wherein the second computer process comprises a second thread executed by a second computer processor.

* * * * *